United States Patent
Ramachandran et al.

(10) Patent No.: US 10,142,108 B2
(45) Date of Patent: Nov. 27, 2018

(54) COPY PROTECTION SCHEME FOR DIGITAL AUDIO AND VIDEO CONTENT AUTHENTICATED HDCP RECEIVERS

(71) Applicant: Real Image Media Technologies (P) Ltd., Chennai (IN)

(72) Inventors: Rajesh Ramachandran, Burbank, CA (US); Senthil Kumar, Chennai (IN)

(73) Assignee: Qube Cinema, Inc., Burbank, CA (US)

( * ) Notice: Subject to any disclaimer, the term of this patent is extended or adjusted under 35 U.S.C. 154(b) by 0 days.

(21) Appl. No.: 13/919,400

(22) Filed: Jun. 17, 2013

(65) Prior Publication Data

US 2014/0372759 A1   Dec. 18, 2014

(51) Int. Cl.
  *H04L 29/06*    (2006.01)
  *H04L 9/32*    (2006.01)
  *H04N 21/258*   (2011.01)
  *H04N 21/6377*   (2011.01)
  *H04N 21/647*   (2011.01)
  *H04L 9/30*    (2006.01)

(52) U.S. Cl.
  CPC ..... *H04L 9/3226* (2013.01); *H04N 21/25816* (2013.01); *H04N 21/63775* (2013.01); *H04N 21/647* (2013.01); *H04L 9/30* (2013.01)

(58) Field of Classification Search
  USPC ........................................................ 713/171
  See application file for complete search history.

(56) References Cited

U.S. PATENT DOCUMENTS

| | | | | |
|---|---|---|---|---|
| 6,151,606 | A * | 11/2000 | Mendez | 707/610 |
| 7,242,766 | B1 * | 7/2007 | Lyle | 380/2 |
| 7,383,438 | B2 * | 6/2008 | Fahrny | H04N 7/17318 |
| | | | | 348/E5.004 |
| 7,506,368 | B1 * | 3/2009 | Kersey et al. | 726/12 |
| 7,529,935 | B2 * | 5/2009 | Saito et al. | 713/168 |
| 7,703,141 | B2 * | 4/2010 | Alkove | G06F 21/10 |
| | | | | 380/255 |
| 7,900,047 | B2 * | 3/2011 | Lyle | H04L 9/12 |
| | | | | 713/171 |
| 7,945,047 | B2 * | 5/2011 | Rogoff et al. | 380/200 |
| 8,019,999 | B2 * | 9/2011 | Candelore | H04N 21/43632 |
| | | | | 713/151 |

(Continued)

FOREIGN PATENT DOCUMENTS

CN       102891754 A    1/2013

OTHER PUBLICATIONS

Jain, R., et al, 'Simplifying HDCP Verification Using Questa® VIP', Mentor Graphics—A Siemens Business, Jun. 2, 2016, entire document, https://www.mentor.com/products/fv/verificationhorizons/volume12/issue2/simplifying-hdcp-verification-questa-vip.*

(Continued)

*Primary Examiner* — Luu T Pham
*Assistant Examiner* — Ronald Baum

(57) ABSTRACT

A method of delivering digital audio and video content and a HDCP source device are disclosed herein. In one embodiment the method includes: (1) receiving an encryption key from a potential receiver of the digital audio and video content, (2) authenticating the potential receiver is an HDCP compliant device and (3) in addition to the authenticating, verifying the potential receiver is a trusted device for receiving the digital audio and video content.

14 Claims, 2 Drawing Sheets

(56) References Cited

U.S. PATENT DOCUMENTS

Figure 1:
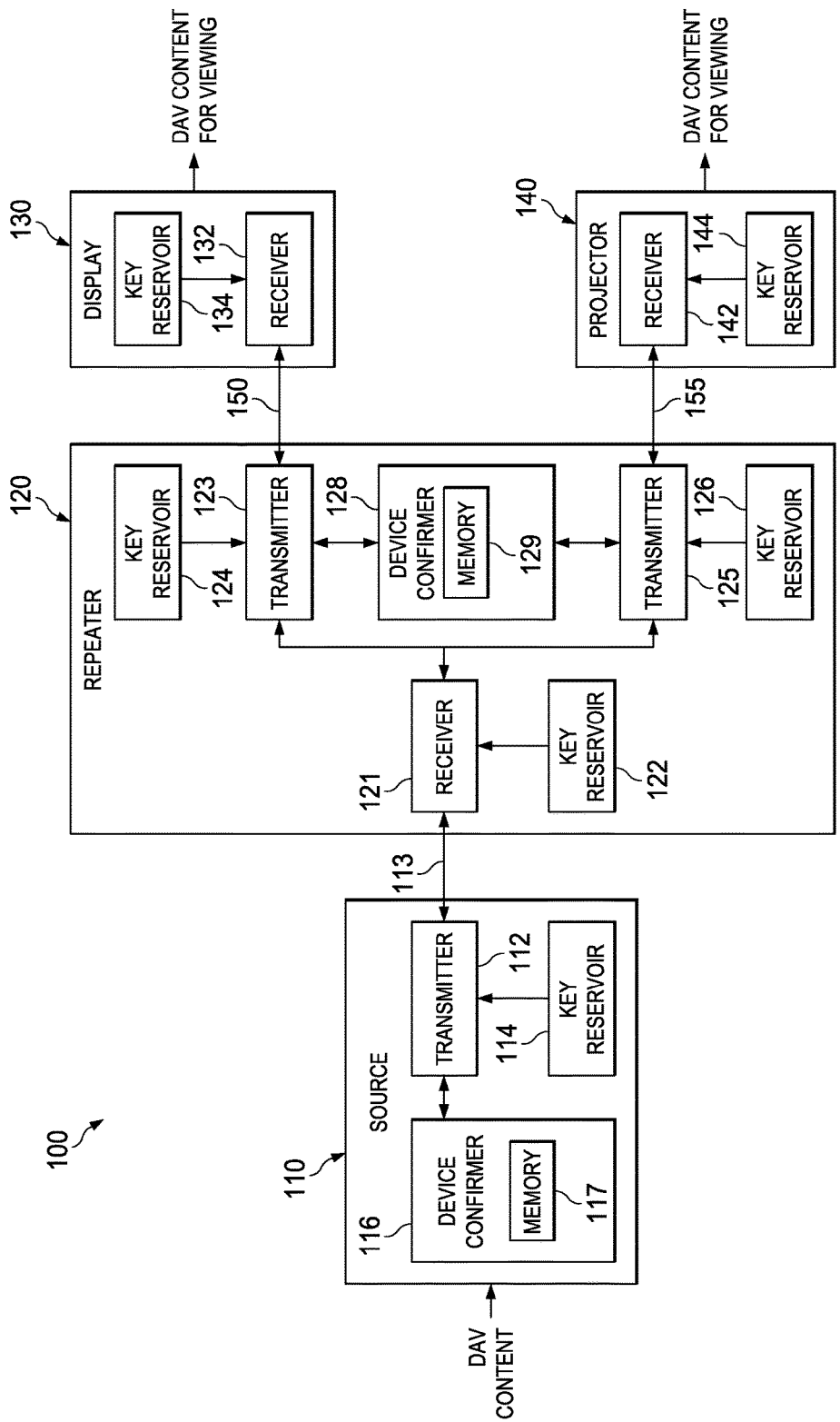

| | | | | |
|---|---|---|---|---|
| 8,095,985 B2* | 1/2012 | Dunbar | G06F 21/10 | 726/26 |
| 8,161,564 B2* | 4/2012 | Devanand | H04L 9/0631 | 380/270 |
| 8,181,262 B2* | 5/2012 | Cooper et al. | | 726/28 |
| 8,250,633 B2* | 8/2012 | Vedula | H04L 63/0815 | 713/168 |
| 8,302,200 B2* | 10/2012 | Lynch | G06F 21/10 | 709/231 |
| 8,375,150 B2* | 2/2013 | Guillerm | G09G 5/006 | 710/18 |
| 8,442,215 B2* | 5/2013 | Jackson | H04N 21/4122 | 380/2 |
| 8,611,818 B2* | 12/2013 | Hillyard | H04L 63/10 | 455/41.1 |
| 8,751,800 B1* | 6/2014 | Dorwin | | 713/167 |
| 8,855,305 B2* | 10/2014 | Devanand | H04L 9/0631 | 380/201 |
| 2002/0004773 A1* | 1/2002 | Xu et al. | | 705/36 |
| 2003/0221100 A1* | 11/2003 | Russ | H04L 12/2805 | 713/153 |
| 2004/0032950 A1* | 2/2004 | Graunke | H04L 9/065 | 380/42 |
| 2004/0039927 A1* | 2/2004 | Hazama et al. | | 713/189 |
| 2004/0250273 A1* | 12/2004 | Swix | H04N 21/4122 | 725/25 |
| 2005/0069130 A1* | 3/2005 | Kobayashi | | 380/201 |
| 2005/0075986 A1* | 4/2005 | You | H04L 63/0435 | 705/71 |
| 2005/0144468 A1* | 6/2005 | Northcutt | G06F 21/10 | 713/189 |
| 2005/0154917 A1* | 7/2005 | deCarmo | H04L 63/08 | 726/4 |
| 2005/0220304 A1* | 10/2005 | Lenoir | G06F 21/445 | 380/255 |
| 2005/0240985 A1* | 10/2005 | Alkove | G06F 21/10 | 726/1 |
| 2006/0085351 A1* | 4/2006 | Hug | G06F 21/10 | 705/59 |
| 2006/0236097 A1* | 10/2006 | Prologo | H04L 63/0823 | 713/156 |
| 2007/0016784 A1* | 1/2007 | Vauclair | | 713/176 |
| 2007/0061875 A1* | 3/2007 | Le Buhan | H04N 7/165 | 726/10 |
| 2008/0046728 A1 | 2/2008 | Lyle | | |
| 2008/0127312 A1* | 5/2008 | Iwamoto | G11B 20/00086 | 726/4 |
| 2008/0177998 A1* | 7/2008 | Apsangi | H04L 63/0428 | 713/155 |
| 2008/0235810 A1* | 9/2008 | Staring | G06F 21/10 | 726/29 |
| 2008/0254878 A1* | 10/2008 | Saunders | G06F 7/58 | 463/29 |
| 2009/0031144 A1* | 1/2009 | Williams | H04N 21/2585 | 713/193 |
| 2009/0089842 A1* | 4/2009 | Perry | H04W 72/005 | 725/78 |
| 2009/0183254 A1* | 7/2009 | Franco et al. | | 726/17 |
| 2010/0011391 A1* | 1/2010 | Carpenter | H04N 7/17318 | 725/25 |
| 2010/0077463 A1* | 3/2010 | Rickelton-Abdi | G06F 21/10 | 726/5 |
| 2010/0217837 A1* | 8/2010 | Ansari | G06Q 30/04 | 709/218 |
| 2010/0235869 A1 | 9/2010 | Zhao et al. | | |
| 2011/0047597 A1* | 2/2011 | Mahaffey | G06F 21/564 | 726/3 |
| 2011/0072269 A1* | 3/2011 | Takechi | G06F 21/10 | 713/175 |
| 2011/0093722 A1* | 4/2011 | Devanand | H04L 63/10 | 713/189 |
| 2011/0197073 A1* | 8/2011 | Taraci | G06F 21/10 | 713/185 |
| 2011/0305443 A1* | 12/2011 | Sasaki et al. | | 386/357 |
| 2012/0173877 A1* | 7/2012 | Pendakur | G06F 21/123 | 713/169 |
| 2012/0197977 A1* | 8/2012 | Nagasaka et al. | | 709/203 |
| 2012/0331528 A1* | 12/2012 | Fu et al. | | 726/4 |
| 2013/0125225 A1* | 5/2013 | Candelore | | 726/7 |
| 2013/0174238 A1* | 7/2013 | Wang | H04N 21/25816 | 726/7 |
| 2013/0179593 A1* | 7/2013 | Dunlap et al. | | 709/244 |
| 2013/0212613 A1* | 8/2013 | Velasco | H04N 21/25 | 725/25 |
| 2013/0268771 A1* | 10/2013 | Blankenbeckler | H04L 9/0866 | 713/189 |
| 2013/0326220 A1* | 12/2013 | Connelly et al. | | 713/168 |

OTHER PUBLICATIONS

Extron Electronics, 'DRM for the A/V Professional', Jan. 27, 2010, Extron Electronics, entire document, http://www.creationnetworks.net/assets/drmavprofessionalwp.pdf.*

Bell, I. A., "RIP HDMI: Misadventures with Shaw, Motorola PVRs, and HDCP," Apr. 4, 2007, 3 pages.

"High-bandwidth Digital Content Protection System," Digital Content Protection LLC, Revision 1.4, Jul. 8, 2009, 90 pages.

"DC20 Digital Cinema Server Installation and Operating Guide," Datasat Digital Entertainment, Version 1.1, Sep. 2009, 31 pages.

International Search Report and the Written Opinion of the International Searching Authority dated Oct. 24, 2014, Applicant: Qube Cinema, Inc., 8 pages.

* cited by examiner

COPY PROTECTION SCHEME FOR DIGITAL AUDIO AND VIDEO CONTENT AUTHENTICATED HDCP RECEIVERS

TECHNICAL FIELD

This application is directed, in general, to delivering digital audio and video (DAV) content and, more specifically, to DAV content protection.

BACKGROUND

While analog audio and video content may produce a higher quality reproduction, DAV content continues to become more popular. Several reasons exist for the popularity of DAV content that include the ongoing improvement of data sampling and generation of the DAV content itself. The continual development of consumer devices that play the created digital DAV content also contributes to the popularity. Additionally, the ease of reproducing and distributing the digital DAV content to the various devices compared to analog data contributes to the popularity thereof.

With the ease of reproducing and distributing the DAV content comes the concern of digital copying. The entertainment industry is especially concerned due to the possibility of high resolution copies of DAV content being mass distributed. As such, manufacturers developed digital copy protection schemes and components to protect against copying DAV content when being distributed.

Intel Corporation of Santa Clara, Calif., developed a digital copy protection scheme known as High-bandwidth Digital Content Protection (HDCP) to protect the transfer of DAV content from a video source, such as a computer, a satellite television receiver or DVD player, to a receiver, such as a display.

The HDCP scheme or system is meant to prevent HDCP-encrypted content from being played on devices that do not support HDCP or which have been modified to copy HDCP content. Before sending data, a transmitting device checks that the receiver is authorized to receive it. If so, the transmitter encrypts the data to prevent eavesdropping while the digital data is transmitted to the receiver. Several different connections that are HDCP compliant can be used to connect the source to the end device.

SUMMARY

In one aspect, disclosed herein is a method of delivering digital audio and video content. In one embodiment the method includes: (1) receiving an encryption key from a potential receiver of the digital audio and video content, (2) authenticating the potential receiver is an HDCP compliant device and (3) in addition to the authenticating, verifying the potential receiver is a trusted device for receiving the digital audio and video content.

In another aspect, a HDCP source device is disclosed. In one embodiment, the HDCP source device includes: (1) a transmitter configured to deliver digital audio and video content over a communication link to an authenticated HDCP receiver and (2) a device confirmer configured to determine if the authenticated HDCP receiver is also a trusted device and only permit delivery of the digital audio and video content by the transmitter to the authenticated HDCP receiver if the authenticated HDCP receiver is a trusted device.

BRIEF DESCRIPTION

Figure 2:
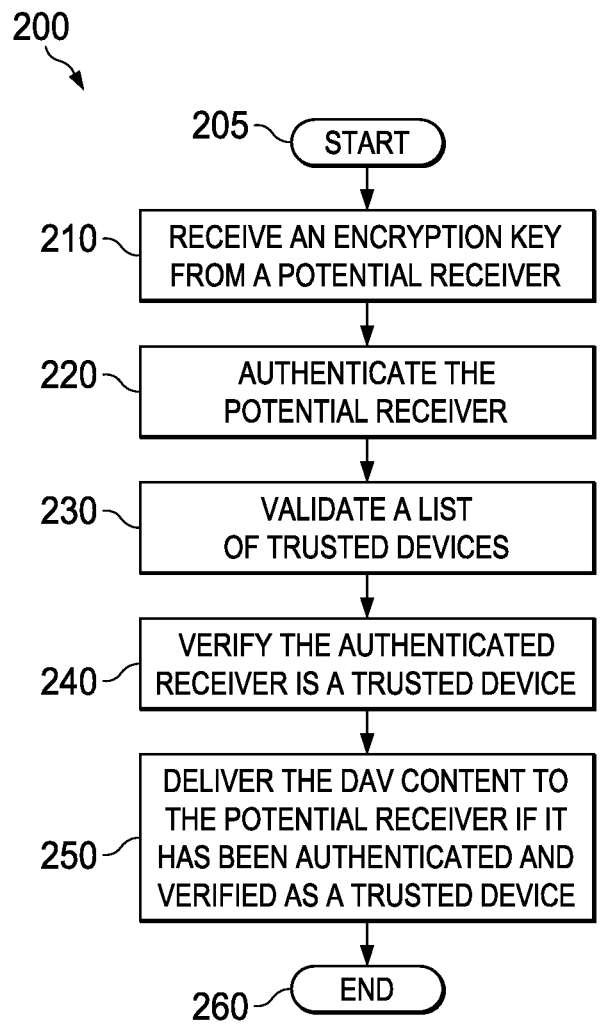

Reference is now made to the following descriptions taken in conjunction with the accompanying drawings, in which:

FIG. 1 illustrates a diagram of an embodiment of a HDCP system constructed according to the principles of the disclosure; and FIG. 2 illustrates a flow diagram of an embodiment of a method of delivering DAV content carried out according to the principles of the disclosure.

DETAILED DESCRIPTION

HDCP alone is not always sufficient for digital copy protection since there are devices available that will decode HDCP and output it in analog form. When in analog form, the content can be easily copied even though there is a small degradation in the quality of the copy because of the digital-to-analog conversion.

Thus, while HDCP may be sufficient to prevent casual copying of content by consumers, HDCP is not always sufficient for digital copy protection in all application including professional applications such as low-cost cinemas and community screens. For these types of professional applications, a Digital Cinema Initiatives (DCI) standard is typically employed. The DCI provides a standard for using digital technology to distribute or project motion pictures that have a higher quality than HDCP. With a DCI system, encrypted content is unlocked via a Key Delivery Message (KDM) which is delivered separately from the DAV content and securely carries the encryption keys of the content to a DCI source. The motion pictures can be sourced via hard drives, the Internet, optical disks including DVDs and Blu-ray, satellite links, or other DCI compliant sources. A digital copy protection scheme that is DCI compliant, however, is a more expensive protection alternative that can be cost-prohibitive for certain applications.

The disclosure provides an enhanced protection scheme that increases digital copy protection for DAV content without a significant cost increase. The disclosed protection scheme can be used with HDCP systems. Thus, the enhanced protection scheme can be employed in applications where DCI is not affordable but where existing HDCP protection is insufficient. The enhanced protection scheme eliminates or at least reduces the threat of decoders that are HDCP compliant but which are capable of generating analog video that can be easily copied. This approach can be implemented with little impact on the cost of copy protection.

Considering HDCP systems, in one embodiment, the protection afforded by the HDCP protection schemes can be enhanced by only allowing output to be delivered to HDCP receivers that are authenticated and are additionally confirmed to be in a specifically authorized list of trusted devices (e.g., a Whitelist). Thus, in addition to being an authenticated HDCP receiver, the receivers also have to be verified as a trusted device before DAV content is transmitted thereto. Authentication is an established HDCP procedure that tests and verifies that transmitters and receivers both properly support HDCP. If authentication is unsuccessful, delivery of the DAV content is blocked. One skilled in the art will understand HDCP authentication for transmitters and receivers as explained below.

Every HDCP device is assigned, by Digital Content Protection (DCP), LLC, a set of forty 56-bit keys known as the Device Private Keys that each device is required to keep secret. Each device is also assigned a 40-bit key selection vector (KSV) that is mathematically related to the private keys of the device and is unique to each device. The KSV of a receiver is known as a BKSV and the KSV of a transmitter is known as an AKSV. The KSV has exactly twenty bits set to one. A transmitter and receiver will exchange their KSVs during the initial stage of HDCP authentication and then use the counterpart KSV to calculate a shared secret. If the receiver has a valid set of private keys, the sum it computes will match the sum computed by the transmitter as a result of the mathematical relationship between the private keys and the KSV. The sum is then used as an initialization value for the HDCP ciphers on either device in the subsequent stages of authentication and encryption.

Thus, an authenticated receiver as used herein is a receiver that has been identified through HDCP authentication to support HDCP and function properly according to HDCP standards. In addition, the disclosed protection scheme further verifies that an authenticated HDCP device is also a trusted device. A trusted device is a HDCP device that has been identified as meeting specific business criteria such as being incapable of converting a received DAV content to analog content. As such, the disclosed protection scheme prevents DAV content from being delivered to devices that are authenticated HDCP devices that do not meet the specific business criteria such as devices that have the capability to convert DAV content to analog content for analog copying.

FIG. 1 illustrates an embodiment of a DAV system in which the disclosed protection scheme is employed.

Turning now to FIG. 1, a block diagram of an embodiment of a HDCP system 100 constructed according to the principles of the disclosure is illustrated. The HDCP system 100 includes a source 110, a repeater 120, a display 130 and a projector 140.

The source 110 is a host of the DAV content. The source 110 can be, for example, a personal computer (PC), a set-top box, a digital cinema server, a DVD player or another similar source that provides DAV content. The source 110 can receive the DAV content via, for example, a DVD, a hard drive, a USB storage device, the Internet, a satellite or another communication or physical medium. The source 110 includes a transmitter 112 and a key reservoir 114. The source 110 can include the functionality of conventional HDCP sources and the additional protection functionality described herein. As such, the source 110 also includes a device confirmer 116. The transmitter 112, the key reservoir 114 and the device confirmer 116 are connected via conventional means.

The transmitter 112 is configured to deliver DAV content over a communication link 113 to the repeater 120. The transmitter 112 can be a conventional transmitter of a HDCP host. For example, the transmitter 112 can be a DVI or HDMI transmitter. The communication link 113 can be a typical communication medium used in HDCP systems. The communication link 113 can be one of various types of connections including a DisplayPort (DP), a Digital Visual Interface (DVI), and High-Definition Multimedia Interface (HDMI).

The key reservoir 114 is configured to store the various keys, such as KSV and private keys, that are used for authenticating HDCP devices and encrypting DAV content. The key reservoir 114 can be a conventional memory that is typically used in HDCP devices for storing the keys.

The device confirmer 116 is coupled to the transmitter 112 and the key reservoir 114. The device confirmer 116 is configured to provide additional protection for DAV content by determining if an authenticated receiver is also a trusted device and based thereon permit delivery of the DAV content. Accordingly, the device confirmer 116 is configured to determine if the repeater 120 is also a trusted device and only permit the transmitter 112 to deliver DAV content to the repeater 120 if the repeater is a trusted device.

In one embodiment, the device confirmer 116 is configured to make the trusted device determination by comparing a unique identifier of the repeater 120 to a list of trusted devices. The trusted device list includes a predetermined list of HDCP receivers that have been identified as trusted devices. In one embodiment, the device confirmer 116 checks for the presence of the BKSV of the repeater 120 in its trusted device list to determine if the repeater 120 is a trusted device. The device confirmer 116 can receive the BKSV from the key reservoir 122 of the repeater 120 via the receiver 121 of the repeater 120 and the transmitter 112.

The trusted device list is stored on a memory 117. As illustrated in FIG. 1, the memory 117 can be part of the device confirmer 116. In other embodiments, the trusted device list can be stored in other memories of the source 110, including the key reservoir 114. The trusted device list can be added to the memory 117 when the source 110 is manufactured. Updates to the trusted device list can be made through DAV content, such as by downloads or from a DVD. As such, the original trusted device list can be expanded or reduced.

In one embodiment, the trusted device list can be stored in a data file, such as a trusted device file. In one embodiment, the trusted device file is a digitally signed file. As such, tampering of the file can be detected. In one embodiment, the device confirmer 116 is further configured to determine if the trusted device list or file has been compromised. As such, the device confirmer 116 is configured to verify that the list of trusted devices is valid. Thereafter the device confirmer 116 proceeds to determine trusted devices.

In one embodiment, the BKSV is not directly stored in the trusted device list, nor transmitted in updates to the trusted device list but a unique representation of the BKSV is stored instead.

In another embodiment, the trusted device list may not be permanently stored in a memory of the source 110. Instead, the trusted list can be received with the DAV content to be transmitted and temporarily stored. Where the content is encrypted, the trusted list can be delivered as part of the content decryption keys. The device confirmer 116 is therefore configured to determine if the receiver exists in the trusted device list delivered with the content keys.

In one embodiment, the device confirmer 116 is configured to determine if connected receivers are trusted devices whenever a state change occurs with the communication link 113. For example, when a connection of the communication link 113 is removed or when a receiver connected to the communication link 113 is removed or replaced, the device confirmer 116 checks for trusted devices.

The repeater 120 is an HDCP device that is configured to receive the DAV content from an upstream source and transmit the DAV content to a downstream sink. The repeater 120 includes a receiver 121 that receives DAV content from the transmitter 112. The repeater also includes a first transmitter 123 and a second transmitter 125 that are configured to deliver DAV content received from the transmitter 112 to the display 130 and the projector 140. The repeater 120 also includes a first key reservoir 122, a second key reservoir 124 and a third key reservoir 126. As with the key reservoir 114, the first, second and third key reservoirs 122, 124 and 126, can be conventional components of HDCP devices that store the various keys used for authenticating and encrypting. The first transmitter 123 and the second transmitter 125 can be conventional HDCP transmitters that deliver DAV content via communication links 150, 155, respectively. The communication links 150, 155, can be the same type of medium as the communication link 113.

The repeater 120 also includes a device confirmer 128. As with the device confirmer 116, the device confirmer 128 is configured to determine if an HDCP receiver is a trusted device. Unlike the device confirmer 116, the device confirmer 128 is coupled to two transmitters, transmitter 123 and transmitter 125, and is configured to determine if receivers coupled thereto are trusted devices for both of these transmitters. Thus, the device confirmer 128 is configured to determine if the display 130 and the projector 140 are trusted devices. As with the device confirmer 116, the device confirmer 128 can determine trusted devices by confirming the BKSV from a receiver exists in a list of trusted devices. One skilled in the art will understand that the repeater 120 can include more than one device confirmer and in some embodiments include a device confirmer that is dedicated to only one transmitter. Additionally, one skilled in the art will understand that the repeater can include any number of transmitters to send content to multiple downstream devices. In some embodiments, a repeater may not be used at all. As such, the source 110 can communicate directly with the display 130 and the projector 140.

In one embodiment, the repeater 120 can be a standard unmodified HDCP device that is configured to pass on the list of BKSVs or Receiver IDs (as used in HDCP 2.2) from downstream back to the transmitter 112. Therefore the transmitter 112 could directly verify all attached receivers against its whitelist.

The display 130 includes a receiver 132 and a key reservoir 134. The projector 140 also includes a receiver 142 and a key reservoir 144. The display 130 can be, for example, a HDCP television and the projector 140 can be a HDCP projector. Unlike the source 110 and the repeater 120, the display 130 and the projector 140 are conventional HDCP devices since the additional DAV content protection disclosed herein is located with the upstream devices to prevent transmission of DAV content if a coupled receiver is not a trusted device.

FIG. 2 illustrates an embodiment of a method 200 of delivering DAV content carried out according to the principles of the disclosure. The method may be carried out by a DAV source, such as the HDCP source 110 or the repeater 120. The method 200 begins in a step 205.

In step 210, an encryption key is received from a potential receiver of DAV content. The encryption key can be a BKSV from a HDCP compliant receiver.

The potential receiver is authenticated as compliant device in a step 220. Authentication can be performed in a conventional manner for either system employing the encryption key.

In a step 230 a list of trusted devices is validated. In one embodiment, the list is validated by confirming that the list has not been compromised. A device confirmer as disclosed herein can be configured to perform validation. In one embodiment, the list of trusted devices is stored in a digitally signed file and validation of the list is based on if the file has been compromised. In another embodiment, the list of trusted devices is received along with the content decryption keys.

The potential receiver is verified as a trusted device for receiving the DAV content in a step 240. Thus, in addition to authentication, a determination is made if the potential receiver is a trusted device. In one embodiment, verifying includes comparing a unique identifier of the potential receiver to a list of trusted devices. The unique identifier can be a BKSV from the receiver or its representation.

In a step 250, the DAV content is delivered to the potential receiver if the potential receiver is determined to be a trusted device. In one embodiment, the DAV content is only delivered after determining the potential receiver is a trusted device. The method 200 ends in a step 260.

At least portions of the above-described apparatuses or methods may be embodied in, provided by or performed by various conventional digital data processors, microprocessors or computing devices. These devices can be programmed or store executable programs of sequences of software instructions to perform one or more of the method steps disclosed herein. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods. Additionally, an apparatus such as a source, a repeater or, more particularly a device determiner of a source or of a repeater, can include the necessary circuitry or programming to perform at least some of the functions described herein including steps of the method 200 in FIG. 2.

Portions of disclosed embodiments may relate to computer storage products with a non-transitory computer-readable medium that have program code thereon for performing various computer-implemented operations that embody a part of an apparatus, system, carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of delivering High-bandwidth Digital Content Protection (HDCP) digital audio and video (DAV) content, comprising:

receiving, at a repeater physically separate from a source and potential receiver, an encryption key directly from said potential receiver of said HDCP DAV content;

authenticating, at said repeater, said potential receiver is an HDCP compliant device using said encryption key from said potential receiver and content decryption keys; and verifying, at said repeater, said potential receiver is a trusted device for receiving said HDCP DAV content by comparing a unique identifier of said potential receiver to a list of trusted devices, said list of trusted devices stored in a memory of said repeater wherein said comparing is performed only by a processor of said repeater, said list of trusted devices transmitted to said repeater from said source of said HDCP DAV content along with said content decryption keys;

wherein said delivering of said HDCP DAV content to said authenticated HDCP compliant device is permitted by said repeater when only said unique identifier of said authenticated HDCP compliant device matches a trusted device of said list of trusted devices.

2. The method as recited in claim 1 wherein said list of trusted devices is locally stored in said repeater as a digitally signed file.

3. The method as recited in claim 1 wherein said unique identifier is a bit key selection vector (BKSV) of said potential receiver.

4. The method as recited in claim 1 wherein said receiving includes receiving said content decryption keys through a Key Delivery Message.

5. The method as recited in claim 4 wherein said Key Delivery Message includes said list of trusted devices and said verifying includes comparing a unique identification of said potential receiver to said list of trusted devices.

6. The method as recited in claim 1 wherein said list is stored in a memory of said source of said HDCP DAV content.

7. The method as recited in claim 1 wherein said verifying is performed in response to a change in state of a link for said delivering.

8. The method as recited in claim 1 wherein said list of trusted devices includes a unique representation of a bit key selection vector (BKSV).

9. The method as recited in claim 1 wherein said content decryption keys include a 40-bit key selection vector (KSV) and Device Private Keys.

10. A High-bandwidth Digital Content Protection (HDCP) system, comprising:
    a source configured to deliver HDCP digital audio and video (DAV) content over a communication link to an HDCP receiver; and
    a repeater physically separate from said source and receiver, coupled to said transmitter, comprising:
        at least one key reservoir configured to authenticate said HDCP receiver using an encryption key received directly from said HDCP receiver and content decryption keys; and
        a device confirmer, said device confirmer including a memory to store a list of trusted devices; wherein:
            said device confirmer is configured to determine if said authenticated HDCP receiver is a trusted device by comparing a unique identifier of said authenticated HDCP receiver with said stored list of trusted devices, wherein said comparing is performed only by a processor of said repeater,
            said list of trusted devices is transmitted to said repeater from said source of said HDCP DAV content along with said content decryption keys; and
            said device confirmer of said repeater permits delivery of said HDCP DAV content by said source to said authenticated HDCP receiver when only said unique identifier matches a trusted device of said stored list of trusted devices.

11. The HDCP device as recited in claim 10 wherein said authenticated HDCP receiver is a display.

12. The HDCP device as recited in claim 10 wherein said device confirmer is configured to determine if said HDCP receiver is said trusted device based on a BKSV thereof.

13. The HDCP device as recited in claim 12 wherein said device confirmer is configured to perform said determining based on said BKSV at a state change of said communication link.

14. The HDCP device as recited in claim 10 wherein said content decryption keys include a 40-bit key selection vector (KSV) and Device Private Keys.

* * * * *